(12) United States Patent
Poisson

(10) Patent No.: US 8,152,612 B1
(45) Date of Patent: Apr. 10, 2012

(54) ONLINE GAMING SYSTEM FOR SIMULATING A FOOTBALL GAME

(76) Inventor: Renald Poisson, Houston, TX (US)

( * ) Notice: Subject to any disclaimer, the term of this patent is extended or adjusted under 35 U.S.C. 154(b) by 406 days.

(21) Appl. No.: 12/427,047

(22) Filed: Apr. 21, 2009

Related U.S. Application Data

(60) Provisional application No. 61/046,849, filed on Apr. 22, 2008.

(51) Int. Cl.
*A63F 9/24* (2006.01)
(52) U.S. Cl. ............................................. 463/4; 463/43
(58) Field of Classification Search .................. 463/4, 7, 463/43
See application file for complete search history.

(56) References Cited

U.S. PATENT DOCUMENTS

| | | | |
|---|---|---|---|
| 5,772,512 A | | 6/1998 | Chichester |
| 5,779,549 A | * | 7/1998 | Walker et al. ................... 463/42 |
| 5,906,370 A | | 5/1999 | Poisson |
| 6,135,885 A | * | 10/2000 | Lermusiaux .................... 463/20 |
| 6,758,754 B1 | * | 7/2004 | Lavanchy et al. ............... 463/42 |
| 2006/0252530 A1 | | 11/2006 | Oberberger et al. |

* cited by examiner

*Primary Examiner* — Brook Kebede
(74) *Attorney, Agent, or Firm* — Buskop Law Group, PC; Wendy Buskop

(57) ABSTRACT

An online gaming system for simulating a football game comprising a server with a processor, a network in communication with the server, at least one client device in communication with the network, wherein the at least one client device has an input device, a display device, and a monetary acceptance feature, and a database in communication with the processor. The database comprises an electronic deck of playing cards comprising offensive play cards and defensive play cards and an electronic deck of special teams cards. Computer instructions in the database instruct the processor to permit input of bets, electronically deal cards from the electronic decks, designate offense and defense players, permit selection of cards by players, determine game outcomes based on the selected cards, and award winnings based on bets and game outcomes.

13 Claims, 2 Drawing Sheets

ONLINE GAMING SYSTEM FOR SIMULATING A FOOTBALL GAME

CROSS REFERENCE TO RELATED APPLICATIONS

This application claims priority to U.S. Provisional Application Ser. No. 61/046,849 filed on Apr. 22, 2008, entitled: "Online Gaming System for Simulating a Football Game". This reference is hereby incorporated in its entirety herein.

FIELD

The present embodiments generally relate to an online gaming system for simulating a football game. The simulated football game closely follows how professional football games are played and includes a monetary acceptance feature for placing bets based on game outcome.

BACKGROUND

A need exists for an online gaming system that simulates a game of football and that closely follows the manner in which professional football games are played, while enabling users to experience the simulated football game from a home computer, a public computer, or a gaming machine.

A further need exists for an online gaming system that provides a simulated game of football that uses cards, thereby incorporating card game elements and strategies, such as bluffing, learning playing strategies of opponents, reading opponents to determine bluffs, counting cards, and the confrontation and competitive aspects of popular card games.

A need also exists for an online gaming system for providing a simulated game of football that allows users to place bets and receive winnings based on odds and game outcomes, in the style of popular slot and video card machines.

The present embodiments meet these needs.

BRIEF DESCRIPTION OF THE DRAWINGS

The detailed description will be better understood in conjunction with the accompanying drawings as follows.

Figure 1:
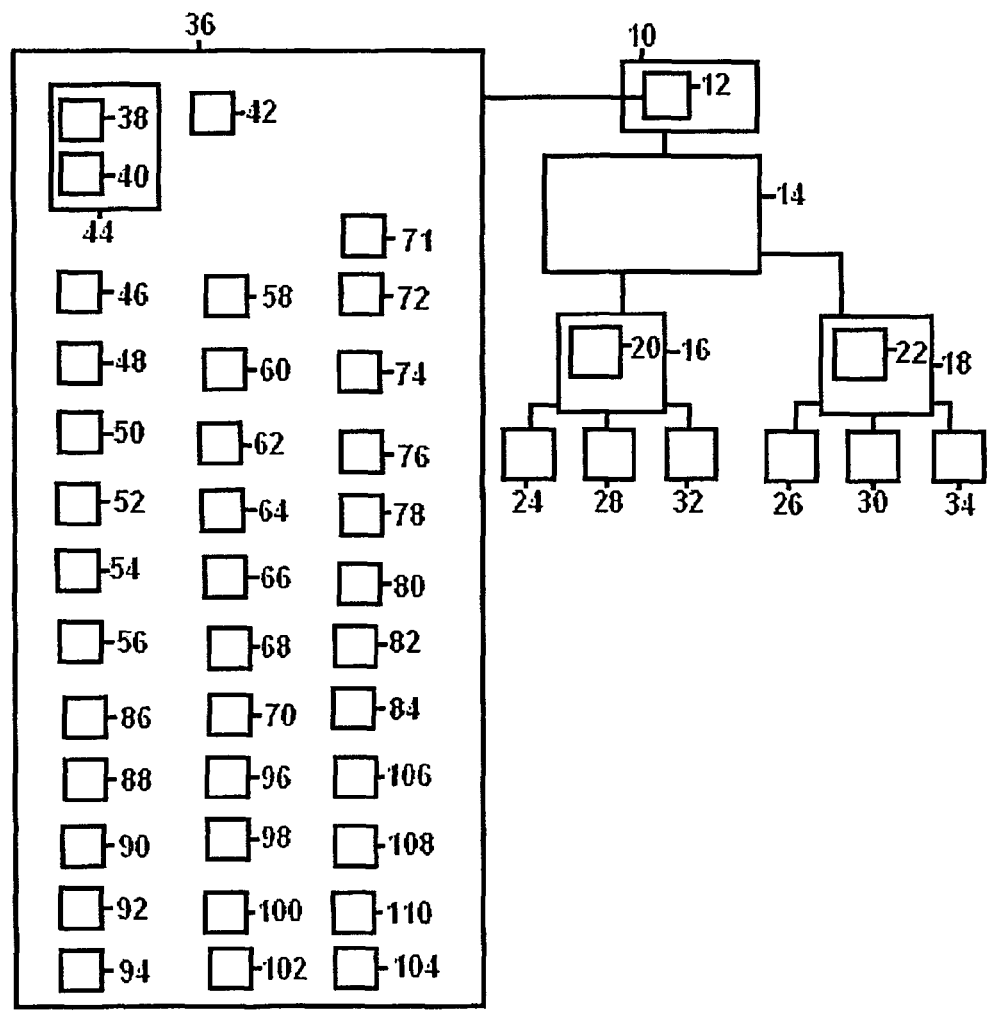
FIG. 1 depicts a schematic drawing of the components of an embodiment of the present system.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to an online gaming system for simulating a football game that combines game-play and finesse elements found in popular card games with odds and gambling elements found in slot and video card games.

The present system provides the benefit of enabling one or more users to participate in a simulated football game that closely follows the manner in which professional football games are played. Offensive cards representing nearly all types of plays used in professional football can be played, each offensive card indicating an outcome, such as a gain of yards, or special instructions. Defensive cards having corresponding types of plays indicated thereon can be used to counter offensive cards, negating a gain of yards, causing a loss of yards, or providing other special instructions.

Special teams cards can be dealt in certain circumstances, to simulate the results of special team plays, such as kickoffs, punts, punt returns, and field goal attempts.

Through use of a database, which can be in communication with a network-accessible server, the present system can be accessed directly or remotely by any number of users, individually or simultaneously, for supporting both competitive play between human opponents and play against a simulated player controlled by the server processor.

The present system can enable users to enjoy a simulated game of football that can incorporate both card game and gambling elements, from the comfort of a home computer, or using publicly accessible machines in arcades, casinos, and other similar locations.

The present system is advantageously easy to utilize and can permit use of any type and any number of input devices, including a keyboard, a mouse, a touch screen, or other similar input devices. Through use of computer instructions, the present system can automatically randomize and deals cards, and a user need only select visible cards depicted on a display device to cause the simulated football game to progress. The present system can automatically deal replacement cards, as necessary, and perform all necessary processes and calculations to determine a game outcome based on the selected cards.

The present system can provide education relating to the sport of football to players and onlookers in a fun and entertaining manner, using the strategic and finesse-based elements of card gaming.

The present system can include a server, which can further have a processor, which can be an Intel™ processor, an AMD™ processor, or another similar type of processor able to execute computer instructions.

One or more networks can be in communication with the server. Useable networks can include the internet, an intranet, a local area network, a wide area network, a virtual private network, a satellite network, a cellular network, other similar networks, and combinations thereof.

At least one client device can communicate with the processor through at least one user interface, which can be in communication with the network. Each client device can be contemplated to include one or more input devices, display devices, and a monetary acceptance feature.

Client devices can include computers, dumb terminals and/or gaming machines in communication with the network, or other devices able to accept input, display output, and communicate with a network, such as a personal digital assistant, a cellular telephone, and similar devices.

It can be contemplated that useable input devices can include a keyboard, a mouse, a keypad, a touch screen, a microphone or speaker and speech-to-text software, and other similar devices.

Monetary acceptance features can include means for accepting credit cards and debit cards, such as card readers, means for accepting currency, such as bill and coin insertion slots, means for accepting facility-specific credits, such as readers for cards issued by casinos, or combinations thereof. It can also be contemplated that one or more input devices can also function as a monetary acceptance feature. For example, a computer keyboard or a keypad on a cellular telephone can be used to input a credit card or debit card number and other information necessary to process charges. A mouse or touch screen can also be used to select numbers to input credit card or debit card information.

The present system can also include a database in communication with the processor.

The database can include an electronic deck of playing cards. The electronic deck of playing cards can include both offensive play cards and defensive play cards used to simulate plays by an offensive football team and defensive plays to counter the offensive plays.

Offensive play cards can include run cards, which display thereon a type of football running play and a result, which can include a gain of yards. In an embodiment, run cards can include pitch out, end run, off tackle, trap play, flanker reverse, line plunge, draw play, end sweep, end around, or double reverse. Run cards can also include special instructions in addition to, or in lieu of a gain or yards, such as a quarterback sneak card.

Offensive play cards can also include pass cards, which display thereon a type of football passing play and a result, which can include a gain of yards. In an embodiment, pass cards can include tight-end pass, sideline pass, split-end pass, short pass, down and out pass, long pass, down and in pass, halfback pass, flanker screen pass, or fullback screen pass.

Offensive play cards can further include penalty cards, which can display thereon a type of football penalty called against a defensive team. Each penalty card can include a penalty name and a result, such as a gain or loss of yards and/or special instructions. In an embodiment, penalty cards can include defense offside cards.

Offensive play cards can also include option plays, which can provide a choice between a listed run or pass play, with or without special instructions, such as an "option play end run or pass complete" card.

Defensive play cards can include run cards that display a type of running play corresponding to one or more types of running plays listed on offensive play cards, paired with a result or instructions, such as a loss of yards or an indication of no gain. For example, an offensive play card reading "end run, 10 yard gain" could be played, and in response to the offensive play card, a defensive play card reading "end run, no gain" could be played, nullifying the 10 yard gain of the offensive play card, and resulting in the accumulation of a down.

It can be contemplated that a football offense player can attempt to play offensive play cards for which a football defense player lacks a responsive card, while the football defense player attempts to strategically predict and/or coax certain offensive play cards to be played. For example, a football defense player can elect to avoid playing an "end run, no gain" card in response to an offensive play card reading "end run, 5 yard gain," with the intent that a football offense player can conclude that the football defense player lacks any cards to counter an end run card. Then, if the football offense player plays a second end run offensive play card, such as a card reading, "end run, 15 yard gain," the football defense player can then play the "end run, no gain" card.

As play progresses, it can be contemplated that players can track past plays and count cards, facilitating the prediction of future plays.

Defensive play cards can also include pass cards that display a type of passing play corresponding to one or more types of passing plays listed on offensive play cards, paired with a result or instructions, such as an indication of an incomplete pass and accumulation of a down.

Defensive play cards can further include special cards, such as an interception card, which indicates the interception of a specified type of pass paired with a result, such as a number of yards gained by the defensive team, and can include special instructions. Special cards can also include quarterback sack cards, which can include a result, such as a loss of yards, and/or special instructions. Special cards can also include option plays, which can include a type of play listed on an offensive play cards, paired with results and/or special instructions.

Special cards can also include a fumble card, which can include special instructions, and which can result in a turnover, causing the offensive team to be designated as the defensive team, and vice versa.

Defensive cards can additionally include penalty cards, which include a type of football penalty called against an offensive team, and a result, such as a loss of yards and/or special instructions. In an embodiment, penalty cards can include offensive holding and offense offside cards.

The database can also include an electronic deck of special teams cards, which can be used to simulate special teams plays undertaken by both offensive and defensive football teams. It can be contemplated that cards from the electronic deck of special teams cards can be dealt randomly when placed in play, rather than selected by players for use.

It can be contemplated that a player can elect to have a special teams card electronically dealt in lieu of playing an offensive or defensive football card to simulate special plays, such as field goal attempts, points after touchdowns, punts, punt returns, and kickoff returns. Each special teams card can be contemplated to include a list of results, which can include a number of yards gained or lost, success or lack thereof of a field goal or point after touchdown, a fumble, a touchback, a blocked punt or field goal, a touchdown. Each listed result can be associated with an item from a list of special teams plays, such as a field goal attempt, a point after touchdown attempt, a punt attempt, a punt return attempt, or a kick off return attempt.

The database can further include computer instructions for instructing the processor to permit input of a bet from the input device and the monetary acceptance feature through the user interface and the network to the server. For example, a user can insert a credit card into a credit card reader, then use a keyboard or touch screen to enter and confirm a bet amount.

Bets accepted by the processor can include bets relating to the winner of the game, bets specifying which team will have more points at a certain point in the game, or similar bets relating to the game outcome. Bets can also be placed relating to amounts of points scored by either or both simulated football teams, the spread in points between the two simulated teams, or other bets relating to point totals. Bets can also be placed relating to individual plays and/or game outcomes, such as whether the next card played will result in points scored, a first down, a gain or loss of yards, a turnover, or any other possible game outcome.

Bets can include single-play bets, such as a bet that the next card played will result in a successful run, a failed run, a successful pass, a failed pass, a first down, a successful field goal, a missed filed goal, a touchdown, a safety, a turnover, a third down conversion, a fourth down conversion, or other similar game outcomes.

Bets can also include bets that persist for a simulated possession, which can include up to four simulated plays, such as a bet that the current possession will result in a first down, a punt, a third down conversion, a fourth down conversion, a successful field goal, a missed field goal, a touchdown, a safety, a turnover, or other game outcomes.

Bets can further include bets that persist for an extended portion of the simulated game of football, such as a quarter or a half, or for the duration of the simulated game of football. Such bets can include a bet predicting which team will win the game, one or more point totals or point spreads at certain points in the game, whether the game will be tied at the end of regular play and extend into overtime, which team will win during overtime, whether a safety will occur, independent or comparative predictions of total values of various game statistics, such as total yards rushed, total yards passed, total field goals made or missed, total yards punted, or total yards returned during punt return plays, or other similar types of bets.

Additional computer instructions can instruct the processor to electronically deal a first plurality of cards from the electronic deck of playing cards and display the first plurality of cards on the display. It can be contemplated that the first plurality of cards constitutes the user's hand. A user's hand can include from five to eleven cards. For example, a five-card hand can be used when playing a simulated football game using a video card machine at a casino, while an eleven card hand, representative of the number of participating players on a football team, can be used in an internet-based game or a high roller game at a casino.

Computer instructions can also instruct the processor to electronically deal a second plurality of cards from the electronic deck of playing cards to a second player. The second player can be a simulated player controlled by the processor. In an embodiment, the second plurality of cards can instead be dealt to a second user playing competitively with a first user.

Computer instructions can then instruct the processor to designate a football offense player and a football defense player. The designation can be performed randomly. In an embodiment, the computer instructions can permit selection by a user using the input device indicating whether the user wishes to begin play as the football offense player or the football defense player.

In an embodiment, computer instructions in the database can be used to instruct the processor to permit selection of a coin toss outcome by a user, to simulate a coin toss and display the coin toss outcome, and to compare the coin toss outcome with the selected outcome, permitting designation of the football offense player and football defense player by the user if the coin toss outcome matches the selected outcome. It can be contemplated that a simulated coin toss can be used to determine the beginning football offense player and football defense player to simulate the manner in which beginning offensive and defensive teams are designated in a professional football game.

The database can also include computer instructions for instructing the processor to permit selection of a first card by the football offense player and to display the first card on the display. Computer instructions can also instruct the processor to electronically deal to the football offense player a replacement card for the first card from the electronic deck of playing cards.

It can be contemplated that typically, the football offense player can play an offensive play card to attempt to gain a number of yards and/or score points.

In the event that the football offense player selects an offensive play card, computer instructions can be used to instruct the processor to permit the football defense player to select a second card and to display the second card. The second card can be selected for discard, or the second card can be a defensive play card having a type of play indicated thereon that corresponds to the type of play indicated on the offensive play card.

Even if the second card is discarded, it can be contemplated that computer instructions can instruct the processor to display the second card on the display device, to facilitate counting of cards and tracking of possible future plays.

In the event that the football defense player selects a defensive play card having a type of play corresponding to the offensive play card, both the offensive play card and the defensive play card are used to determine the game outcome.

Computer instructions can then instruct the processor to deal a replacement card for the second card.

It can also be contemplated that the football offense player can perform a tactic known as "clutching," by playing a defensive play card rather than an offensive play card. The football offense player can voluntarily incur the negative consequences of the selected defensive play card, and computer instructions can then instruct the processor to deal a replacement card for the selected defensive play card. This strategy can be useful when a player wishes to intentionally lose one or more individual plays to cause a desirable long term game outcome, such as a resulting specified point total on which the player has placed a bet. "Clutching" can also be useful when a football offense player lacks sufficient offensive play cards to score points but possesses special defensive play cards that could possibly cause a turnover or a safety when playing as the football defense player.

If the football offense player plays a defensive play card, it can be contemplated that the football defense player is not permitted to select a second card for discard or to select a second card to play in response for the first card.

Computer instructions in the database can instruct the processor to determine a game outcome based on the first card, and if played, the second card. Game outcomes can include a gain or loss of yards, scored points, accumulation of a down, achievement of a new first down, a turnover, which causes the football defense player to be designated as the football offense player and the football offense player to be designated as the football defense player, or other similar results.

In an embodiment, computer instructions can instruct the processor to play a video, animation, or combinations thereof, that depicts a representation of the game outcome. For example, a video or animation of a quarterback completing a long pass prior to an unsuccessful quarterback sack can be played when the football offense and football defense players play cards indicating such a result.

The database can also include computer instructions for instructing the processor to award winnings based on the bet and the game outcome.

In an embodiment, the database can include computer instructions for instructing the processor to permit selection of one or more cards by the football offense player to be placed in an offense time out hand, which can be stored in the database. The computer instructions can also permit selection of cards by the football defense player to form a defense time out hand, which can also be stored in the database.

Computer instructions in the database can then be used to instruct the processor to permit the football offense player or the football defense player to declare a time out during play, and to permit each player to select cards for exchange with selected cards from their respective time out hands. It can be contemplated that the computer instructions can instruct the processor to designate a limited number of times each player can declare a time out, such as twice per each half of the simulated game of football.

For example, a football defense player can select five offensive play cards for placement in a time out hand, while retaining sufficient defensive play cards to cause a turnover, which designates the football offense player as the football defense player and the football defense player as the football offense player. At that time, the football offense player, who was previously the football defense player, can declare a time out and exchange one or more cards with the time out hand to acquire the offensive play cards that were placed in the time out hand.

A simulated game of football can be divided into quarters, halves, or other segments of time by automatically determining that each segment of time expires after a predetermined number of cards have been played. Users can also be permitted to select the length of each half, or other time segment, of the simulated football game. For example, each time the electronic deck of playing cards is exhausted, it can be declared that one half of the simulated game of football has expired. The present system can then electronically randomize the cards, electronically deal hands to each player, and begin the second half of play.

In an embodiment, computer instructions in the database can instruct the processor to permit the football offense player to elect to perform a special teams play in lieu of selecting the first card. The computer instructions can then instruct the processor to electronically deal a first special teams card from the electronic deck of special teams cards and to display the first special teams card on the display. The first special teams card can be used to determine the game outcome.

For example, if a simulated line of scrimmage is within thirty yards of a simulated defense team's goal line, a special teams card can be electronically dealt to represent an attempt to score a field goal. The special teams card can then indicate whether points are scored, or whether the simulated field goal attempt was missed. If the simulated line of scrimmage is farther than thirty yards from the simulated defense team's goal line, the special teams card can be electronically dealt to represent an attempt to punt.

Computer instructions in the database can also be used to instruct the processor to permit the football defense player to elect to perform a special teams response in response to the first special teams card. The computer instructions can instruct the processor to electronically deal a second special teams card from the electronic deck of special teams cards and display the second special teams card on the display. Computer instructions can then instruct the processor to determine the game outcome based on the first special teams card and the second special teams cards.

For example, a football offense player can elect to have a first special teams card electronically dealt to simulate a punt attempt. The first special teams card can display a number of yards or another result or instruction associated with a punt attempt. The football defense player can then elect to have a second special teams card electronically dealt to simulate a punt return, which can display a number of yards returned, or another result, such as a blocked punt or a fumble, in association with a punt return attempt.

The football defense player can also elect not to have a second special teams card electronically dealt in response to the first special teams card. For example, to simulate a fair catch, the football defense player could permit a simulated punt attempt to take place without attempting a simulated punt return.

It can be contemplated that the database can also include computer instructions for instructing the processor to display on the display device a simulated football field. The simulated football field can include a gridiron, twenty yard markers that designate five-yard intervals, a down indicator, a score indicator, a possession indicator, a quarter indicator, or combinations thereof.

Computer instructions can further instruct the processor to display on the simulated football field a simulated line of scrimmage, which can include depictions of simulated offensive and defensive football teams and a simulated game ball.

Computer instructions can also instruct the processor to update positions of the line of scrimmage, numbers of downs, a score, a possession, a quarter, or combinations thereof, based on the game outcome.

This embodiment can enable the simulated football game to be represented not only using cards and/or tabular means, but through graphical means as well.

It can be contemplated that computer instructions in the database can also instruct the processor to display on the display a yards rushing indicator, a yards passing indicator, a total offense indicator, a field goals made indicator, a field goals missed indicator, a kickoff return yardage indicator, a punt return yardage indicator, other similar indicators for displaying game information and statistics, or combinations thereof.

Computer instructions can further instruct the processor to update information and values indicated by any of the indicators.

In an embodiment, the present system can also include a secondary bonus slot game. Computer instructions in the database can instruct the processor to display the secondary bonus slot game if one or more play achievements occur. Play achievements can include scoring one or more points, achieving one or more offensive or defensive plays, advancing a predetermined number of yards, scoring a touchdown, scoring a field goal, advancing a predetermined number of yards with a single play, or any other possible game outcome.

The computer instructions can then instruct the processor to permit input of a bonus bet from the input device and the monetary acceptance feature through the user interface and network to the server.

The computer instructions can instruct the processor to electronically spin reels of the secondary bonus slot game and stop the reels, then award bonus winnings based on the bonus bet and the play achievements.

Referring now to FIG. 1, a schematic drawing of an embodiment of the present system is depicted.

FIG. 1 depicts a server (10) having a processor (12). The server (10) can be in communication with a network (14). While FIG. 1 depicts the server (10) in communication with a single network (14), it can be contemplated that the server (10) can be in communication with any type and any number of networks simultaneously.

A first client device (16) and a second client device (18), having a first user interface (20) and a second user interface (22), can be in communication with the network (14). The first client device (16) has a first input device (24) and a first display device (28). The second client device (18) has a second input device (26) and a second display device (30).

While each client device is depicted having a single input device and display device, it can be contemplated that each client device could include any type and number of input and display devices.

The first client device (16) can also include a first monetary acceptance feature (32). The second client device (18) can include a second monetary acceptance feature (34).

A database (36) is shown in communication with the processor (12). The database (36) can be resident in the server (10) and in direct communication with the processor (12). The database (36) can also be remote from the server (10) and in communication with the processor (14) via the network (14).

The database (36) is shown containing an electronic deck of playing cards (44), which includes both offensive play cards (38) and defensive play cards (40) that have been combined and electronically randomized to form the electronic deck of playing cards (44).

The database (36) is also shown containing an electronic deck of special teams cards (42).

Computer instructions (46) in the database (36) can be useable to instruct the processor (12) to electronically randomize the electronic decks of cards. Electronically randomizing the cards can include simulating shuffling of the decks and storing the shuffled order of the cards in the database (36). Electronically randomizing the cards can also include randomly determining the identity of each card at the time it is dealt.

Computer instructions (48) in the database (36) can instruct the processor (12) to permit input of a bet using one of the input devices (24, 26) and one of the monetary acceptance features (32, 34). It can be contemplated that the bet can be stored in the database (36) until the game outcome is determined and winnings can be awarded.

Computer instructions (50) in the database (36) can instruct the processor (12) to electronically deal a first plurality of cards from the electronic deck of playing cards (44) and to display the first plurality of cards on the display device (28). The first plurality of cards is contemplated to constitute a user's hand.

Computer instructions (52) in the database (36) also instruct the processor (12) to electronically deal a second plurality of cards from the electronic deck of playing cards (44) to a second player. The second plurality of cards constitutes the second player's hand. The second player can be a human opponent of the first user, or the second player can be a simulated player controlled by the processor (12). If the second player is a human opponent, the second plurality of cards can be displayed on the display device (30).

Computer instructions (54) in the database (36) can then instruct the processor (12) to designate a football offense player and a football defense player. The designation of the football offense and defense players can be a random designation, or in an embodiment, a user can be permitted to designate the football offense and defense players.

It can also be contemplated that computer instructions (94) in the database (36) can instruct the processor (12) to permit a user to select a coin toss outcome using the input device (24). Computer instructions (96) in the database (36) can then instruct the processor (12) to execute a simulated coin toss and obtain a coin toss outcome. Computer instructions (98) in the database (36) can then instruct the processor (12) to compare the coin toss outcome with the outcome selected by the user, and to permit designation of the football offense and defense players by the user if the selected outcome matches the coin toss outcome.

Computer instructions (56) in the database (36) can instruct the processor (12) to permit selection of a first card by the football offense player and to display the first card on the display device (28, 30).

Computer instructions (58) in the database (36) can then instruct the processor (12) to electronically deal a replacement card for the first card.

FIG. 1 also depicts computer instructions (60) in the database (36) for instructing the processor (12) to determine a game outcome based on the first card. Computer instructions (62) in the database (36) can instruct the processor (12) to award winnings based on the bet and the game outcome.

If the first card is an offensive play card, computer instructions (64) in the database (36) instruct the processor (12) to permit selection of a second card by the football defense player and to display the second card on the display device (28, 30). The computer instructions (60) for determining the game outcome can then determine the game outcome based on both the first card and the second card.

Computer instructions (66) in the database (36) can then instruct the processor (12) to electronically deal a replacement card for the second card.

FIG. 1 further depicts computer instructions (68) in the database (36) for instructing the processor (12) to permit selection of one or more cards by the football offense player to form an offensive time out hand, and to store the offensive time out hand in the database (36).

Computer instructions (70) in the database (36) can instruct the processor (12) to permit selection of one or more cards by the football defense player to form a defensive time out hand, and to store the defensive time out hand in the database (36).

Computer instructions (71) in the database (36) can then be used to instruct the processor (12) to permit the football offense player or the football defense player to declare a time out prior to selecting a card for discard or play.

When a time out is declared, computer instructions (72) in the database (36) instruct the processor (12) to permit selection of one or more cards by the football offense player for exchange with cards in the offensive time out hand. Computer instructions (74) in the database (36) instruct the processor (12) to permit selection of one or more cards by the football defense player for exchange with cards in the defense time out hand.

FIG. 1 also depicts computer instructions (76) in the database (36) for instructing the processor (12) to permit the football offense player to elect to have a special teams card electronically dealt from the electronic deck of special teams cards (42) in lieu of selecting a card for discard or play.

Computer instructions (78) in the database (36) can then instruct the processor (12) to electronically deal a special teams card from the electronic deck of special teams cards (42) and to display the special teams card on the display (28, 30). Computer instructions (60) can then instruct the processor (12) to determine the game outcome based on the special teams card.

Computer instructions (80) in the database (36) can instruct the processor (12) to permit the football defense player to elect to have a special teams card electronically dealt from the electronic deck of special teams cards (42), in response to the special teams card dealt to the football offense player. The computer instructions (78) can then instruct the processor (12) to electronically deal a special teams card to the football defense player. Computer instructions (60) can then instruct the processor (12) to determine the game outcome based on both special teams cards.

FIG. 1 also depicts computer instructions (82) in the database (36) for instructing the processor (12) to permit input of team information from the input device (24) through the user interface (20) and network (14) to the server (10). The computer instructions (82) can further instruct the processor (12) to store the team information in the database (36), and to permit modification to the team information using the input device (24).

Team information can be used to personalize a team and add or remove simulated players, which can be fictional football players or representations of existing professional football players from various time periods.

Computer instructions (84) in the database (36) can instruct the processor (12) to display a simulated football field on the display device (28, 30). Computer instructions (86) in the database (36) can be contemplated to instruct the processor (12) to display a simulated line of scrimmage on the simulated football field. Computer instructions (88) in the database (36) can then instruct the processor (12) to update information on the display device (28, 30), such as positions of the simulated line of scrimmage, numbers of downs, points scored, possessions, quarters, other similar information, or combinations thereof.

FIG. 1 also depicts computer instructions (90) in the database (36) for instructing the processor (12) to display on the display device (28, 30) one or more indicators for providing game information and statistics. Indicators can include a yards rushing indicator, a yards passing indicator, a total offense indicator, a field goals made indicator, a field goals missed indicator, a kickoff return yardage indicator, a punt return yardage indicator, other similar indicators for displaying game information and statistics, or combinations thereof.

Computer instructions (92) in the database (36) can instruct the processor (12) to update the displayed indicators based on the game outcome.

FIG. 1 also shows computer instructions (100) in the database (36) for instructing the processor (12) to permit the football offense player and/or the football defense player to select a card for discard. Computer instructions (102) in the database (36) can instruct the processor (12) to electronically deal a replacement card for the discarded card from the electronic deck of playing cards (44).

FIG. 1 further depicts computer instructions (104) in the database (36) for instructing the processor (12) to display a secondary bonus slot game if one or more play achievements occur. For example, the secondary bonus game could be engaged each time a touchdown is scored, each time a new first down is achieved, each time a punt is kicked, each time a field goal is scored, each time a quarterback is sacked, each time a long pass is completed, or for any other possible game outcome.

Computer instructions (106) in the database (36) can instruct the processor (12) to permit input of a bonus bet from the input device (24) and the monetary acceptance feature (32) through the user interface (20) and the network (14).

Computer instructions (108) in the database (36) also instruct the processor (12) to electronically spin and stop reels of the secondary bonus slot game, or otherwise generate a graphical outcome of the secondary bonus slot game.

Computer instructions (110) in the database (36) can then instruct the processor (12) to award bonus winnings based on the bonus bet and one or more play achievements.

Figure 2:
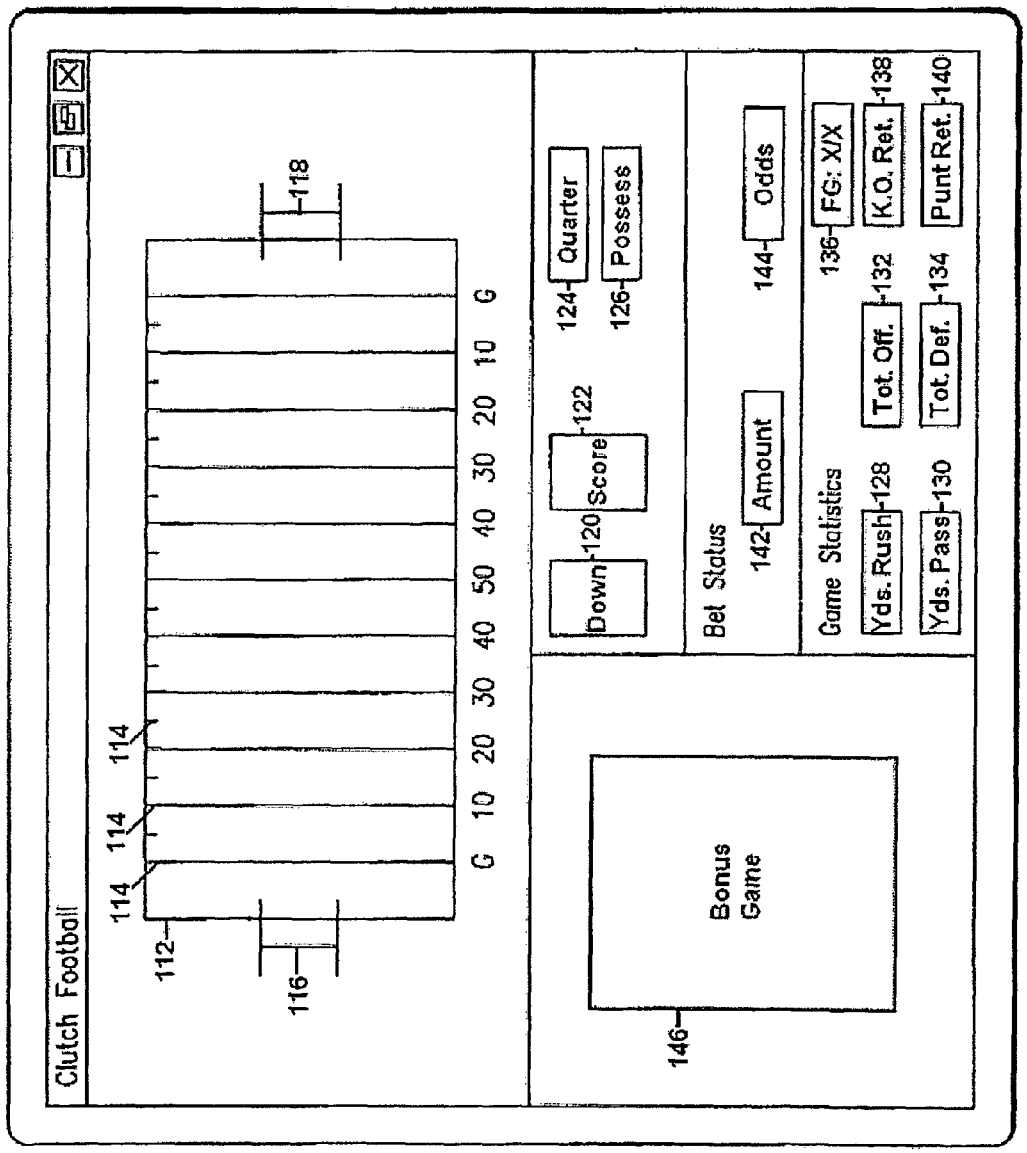
FIG. 2 depicts a display of an embodiment of a simulated football field.

FIG. 2 depicts an embodiment of a simulated football field (112) which can be displayed on one or more display devices. The simulated football field (112) is shown having a plurality of yard markers (114), each designating a five-yard interval, a first football goal (116), and a second football goal (118).

FIG. 2 also depicts a down indicator (120) and a score indicator (122), for displaying numbers of downs and points scored, as determined by the game outcome. FIG. 2 further depicts a quarter indicator (124), for indicating the current quarter of the simulated game of football. The quarter indicator (124) could also indicate halves, or other segments of simulated time. FIG. 2 additionally depicts a possession indicator (126), for indicating the player which is currently the football offense player.

FIG. 2 also depicts numerous indicators for game statistics, including a yards rushing indicator (128), a yards passing indicator (130), a total offense indicator (132), and a total defense indicator (134). A field goals indicator (136) is also depicted, which can indicate both a number of field goals made and a number of field goals missed, or a percentage, fraction, or decimal representing the portion of field goals made. The field goals indicator (136) can also include two separate indicators, a first indicating a number of field goals made and a second indicating a number of field goals missed.

A kickoff return yardage indicator (138) and a punt return yardage indicator (140) are also depicted.

FIG. 2 further depicts indicators for bets, which include a bet amount indicator (142), and an odds indicator (144). Other indicators relating to bets made relating to the game outcome can also be displayed, such as an indicator for a total amount won or lost, minimum and/or maximum bet indicators, and similar indicators.

FIG. 2 also depicts an area for displaying a secondary bonus slot game (146). The area for displaying the secondary bonus slot game (146) can include indicators displaying bets made, odds, minimum and maximum bets, information relating to game outcomes, and other similar indicators and information.

While these embodiments have been described with emphasis on the embodiments, it should be understood that within the scope of the appended claims, the embodiments might be practiced other than as specifically described herein.

What is claimed is:

1. An online gaming system for simulating a football game, the system comprising:
   a. a server with a processor;
   b. a network in communication with the server;
   c. at least one client device with at least one user interface in communication with the network, wherein the at least one client device has an input device, a display device, and a monetary acceptance feature; and
   d. a database in communication with the processor, the database comprising:
      i. an electronic deck of playing cards comprising offensive play cards and defensive play cards;
      ii. an electronic deck of special teams cards;
      iii. computer instructions for instructing the processor to permit input of a bet from the input device and the monetary acceptance feature through the user interface and network to the server;
      iv. computer instructions for instructing the processor to electronically deal a first plurality of cards from the electronic deck of playing cards and display the first plurality of cards on the display device;
      v. computer instructions for instructing the processor to electronically deal a second plurality of cards from the electronic deck of playing cards to a second player;
      vi. computer instructions for instructing the processor to designate a football offense player and a football defense player;
      vii. computer instructions for instructing the processor to permit selection of a first card by the football offense player and display the first card on the display device;
      viii. computer instructions for instructing the processor to electronically deal to the football offense player a replacement card for the first card from the electronic deck of playing cards;
      ix. computer instructions for instructing the processor to determine a game outcome based on the first card; and
      x. computer instructions for awarding winnings based on the bet and the game outcome.

2. The system of claim 1, wherein the first card is an offensive play card, wherein the database further comprises:
   a. computer instructions for instructing the processor to permit selection of a second card by the football defense player for discard or in response to the offensive play card;

b. computer instructions for instructing the processor to electronically deal to the football defense player a replacement card for the second card from the electronic deck of playing cards; and c. wherein the computer instructions for instructing the processor to determine the game outcome instruct the processor to determine the game outcome based on the first card and the second card.

3. The system of claim 1, wherein the database further comprises:

a. computer instructions for instructing the processor to permit selection of at least one card by the football offense player to form an offense time out hand and to store the offense time out hand in the database;

b. computer instructions for instructing the processor to permit selection of at least one card by the football defense player to form a defense time out hand and to store the defense time out hand in the database;

c. computer instructions for instructing the processor to permit the football offense player or the football defense player to declare a time out;

d. computer instructions for instructing the processor to permit the football offense player to select cards for exchange with the offense time out hand; and e. computer instructions for instructing the processor to permit the football defense player to select cards for exchange with the defense time out hand.

4. The system of claim 1, wherein the database further comprises:

a. computer instructions for instructing the processor to permit the football offense player to elect to perform a special teams play in lieu of selecting the first card;

b. computer instructions for instructing the processor to electronically deal a first special teams card from the electronic deck of special teams cards and display the first special teams card on the display device; and c. wherein the computer instructions for instructing the processor to determine the game outcome instruct the processor to determine the game outcome based on the first special teams card.

5. The system of claim 4, wherein the database further comprises:

a. computer instructions for instructing the processor to permit the football defense player to elect to perform a special teams response in response to the first special teams card;

b. computer instructions for instructing the processor to electronically deal a second special teams card from the electronic deck of special teams cards and display the second special teams card on the display device; and c. wherein the computer instructions for instructing the processor to determine the game outcome instruct the processor to determine the game outcome based on the first special teams card and the second special teams card.

6. The system of claim 1, wherein the database further comprises:

a. computer instructions for instructing the processor to permit input of team information from the input device through the user interface and network to the server;

b. computer instructions for instructing the processor to store the team information in the database; and c. computer instructions for instructing the processor to permit modification of the team information using the input device.

7. The system of claim 1, wherein the database further comprises:

a. computer instructions for instructing the processor to display on the display device a simulated football field comprising a gridiron, twenty yard markers that designate five-yard intervals, a down indicator, a score indicator, a possession indicator, a quarter indicator, or combinations thereof;

b. computer instructions for instructing the processor to display on the display device a simulated line of scrimmage on the simulated football field; and c. computer instructions for instructing the processor to update on the display device a position of the simulated line of scrimmage, a number of downs, a score, a possession, a quarter, or combinations thereof, based on the game outcome.

8. The system of claim 7, wherein the database further comprises:

a. computer instructions for instructing the processor to display on the display device a yards rushing indicator, a yards passing indicator, a total offense indicator, a total defense indicator, a field goals made indicator, a field goals missed indicator, a kickoff return yardage indicator, a punt return yardage indicator, or combinations thereof; and b. computer instructions for instructing the processor to update a number of yards rushed, a number of yards passed, the total offense indicator, the total defense indicator, a number of field goals made, a number of field goals missed, the kickoff return yardage indicator, the punt return yardage indicator, or combinations thereof, based on the game outcome.

9. The system of claim 1, wherein the computer instructions for instructing the processor to designate the football offense player and the football defense player comprise:

a. computer instructions for instructing the processor to permit selection of a coin toss outcome from the input device through the user interface and network to the server, forming a selected coin toss outcome;

b. computer instructions for instructing the processor to execute a simulated coin toss and display the coin toss outcome on the display device; and c. computer instructions for instructing the processor to compare the coin toss outcome with the selected coin toss outcome and to permit designation of the football offense player and the football defense player from the input device through the user interface and network to the server if the coin toss outcome matches the selected coin toss outcome.

10. The system of claim 1, wherein the database further comprises:

a. computer instructions for instructing the processor to permit selection by the offense player of at least one offense card for discard, to permit selection by the defense player of at least one defense card for discard, or combinations thereof; and b. computer instructions for instructing the processor to electronically deal a replacement card from the electronic deck of playing cards to replace the at least one offense card for discard, the at least one defense card for discard, or combinations thereof.

11. The system of claim 1, wherein the monetary acceptance feature is a means for accepting credit cards, a means for accepting debit cards, a means for accepting currency, a means for accepting facility-specific credits, or combinations thereof.

12. The system of claim 1, wherein the database further comprises:

a. computer instructions for instructing the processor to display on the display device a secondary bonus slot game if at least one play achievement occurs;

b. computer instructions for instructing the processor to permit input of a bonus bet from the input device and the monetary acceptance feature through the user interface and network to the server;

c. computer instructions for instructing the processor to electronically spin reels of the secondary bonus slot game and stop the reels; and d. computer instructions for instructing the processor to award bonus winnings based on the bonus bet and the at least one play achievement.

13. The system of claim 1, wherein the second player is a simulated player controlled by the processor.

* * * * *